US007433403B2

(12) United States Patent
Ishida et al.

(10) Patent No.: US 7,433,403 B2
(45) Date of Patent: Oct. 7, 2008

(54) PULSE WIDTH MODULATION METHOD FOR A POWER CONVERTER

(75) Inventors: Seiji Ishida, Hitachi (JP); Atsuhiko Nakamura, Yachiyo (JP)

(73) Assignees: Hitachi, Ltd., Tokyo (JP); Hitachi Industrial Equipment Systems Co., Ltd., Chiba-Shi (JP)

( * ) Notice: Subject to any disclaimer, the term of this patent is extended or adjusted under 35 U.S.C. 154(b) by 724 days.

(21) Appl. No.: 10/737,999

(22) Filed: Dec. 18, 2003

(65) Prior Publication Data

US 2004/0131114 A1 Jul. 8, 2004

(30) Foreign Application Priority Data

Dec. 19, 2002 (JP) ............................. 2002-368421

(51) Int. Cl.
H03K 9/08 (2006.01)
(52) U.S. Cl. ...................................... 375/238; 332/109
(58) Field of Classification Search ................. 363/132, 363/37, 142; 375/238; 332/109; 307/66; 318/800
See application file for complete search history.

(56) References Cited

U.S. PATENT DOCUMENTS

2002/0093391 A1 7/2002 Ishida et al.

2004/0131114 A1 * 7/2004 Ishida et al. ................ 375/238

FOREIGN PATENT DOCUMENTS

| JP | 2001-327173 | 11/2001 |
| JP | 2002-095263 | 3/2002 |
| JP | 2002-119062 | 4/2002 |

OTHER PUBLICATIONS

English translation of Japanese Office Action dated Aug. 15, 2006 (Five (5) Pages).
English translation of Japanese Office Action dated Feb. 6, 2007 (Five (5) Pages).
"Derivation of motor line-current waveforms from the DC-link current of an inverter", T.C. Green et al, IEE Proceedings, vol. 136, Pt. B, No. 4, Jul. 1989.

* cited by examiner

*Primary Examiner*—Khai Tran
(74) *Attorney, Agent, or Firm*—Crowell & Moring LLP (57) ABSTRACT

A pulse width modulation method has the steps of operating a second instruction signal so that each of the differences between two or three arbitrary instruction signals in three first instruction signals may become more than the predetermined value, and modulating in pulse width based on the second instruction signal.

3 Claims, 6 Drawing Sheets

PULSE WIDTH MODULATION METHOD FOR A POWER CONVERTER

BACKGROUND OF THE INVENTION

The present invention relates to a pulse width modulation method for controlling a power converter, as well as to a pulse width modulator, a power conversion method, and a power converter.

In a power converter which converts a DC current into an alternating current by pulse width modulation, a method of detecting the electric current of the AC side from the electric current of the DC side is described in the publication "Derivation of motor line-current waveforms from the DC-link current of an inverter" IEEE PROCEEDING, Vol.136, Pt. B, JULY 1989, pp. 196-204.

Moreover, a method disclosed in the Japanese Patent Application Laid-Open No. 2001-327173 provides pulse width modulation suitable for the method of detecting this electric current.

In the technique described in the literature "Derivation of motor line-current waveforms from the DC-link current of an inverter" IEEE PROCEEDING Vol. 136, Pt. B, July 1989, pp. 196-204, it is difficult to detect stably the electric current of the DC side because the electric current pulse width of the DC side becomes small when the AC voltage is at a low level.

In the Japanese Patent Application Laid-Open No. 2001-327173, the electric current pulse width of the DC side is corrected so as to have enough width for steady detection of the electric current pulse width in the first half of one cycle of carrier wave for the pulse width modulation. Moreover, the AC side voltage is corrected to become the desired voltage in the latter half. Therefore, a pulse width necessary for detecting the electric current is not secured in the latter half. Moreover, it is necessary to operate the modulated wave at a cycle of one half of the carrier wave cycle. Therefore, a highly efficient microcomputer is necessary for the operation. Further, an electric current pulse width necessary to detect the electric current might not be able to be secured even in the Japanese Patent Application Laid-Open No. 2001-327173.

In the method according to the Japanese Patent Application Laid-Open No. 2001-327173, a normal switching cannot be occasionally done though the switching of a certain phase and the switching of another phase will be done in a short time due to the mutual interference generated at this time.

As mentioned above, in the case that the output current of the power converter is detected from DC current Idc in the conventional power converter which uses the pulse width modulation, for converting the DC current into the AC current, it is difficult to detect because the pulse width of DC current Idc becomes narrow when the voltage instruction signal between phases is small.

SUMMARY OF THE INVENTION

An object of the present invention is to provide a pulse width modulation method that controls a power converter, as well as a pulse width modulator, a power conversion method, and a power converter, in which the electric current pulse width of the DC side is more than the width which can detect the electric current, and there is no mutual interference at switching.

The pulse width modulation method of the present invention comprises the steps of operating a second instruction signal so that each of the differences between two or three arbitrary instruction signals in three first instruction signals may become more than the predetermined value, and modulating in pulse width based on the second instruction signal.

A power conversion method of the present invention comprises a voltage instruction signal correction step of operating a second AC voltage instruction signal based on a first AC voltage instruction signal, a PWM control step of modulating in pulse width based on said second AC voltage instruction signal, and outputting a gate signal, and a step of switching a DC voltage based on said gate signal, and converting it into an AC voltage. The pulse width modulation is performed by the above-mentioned pulse width modulation method.

Preferably, the above-mentioned power conversion method further comprises a motor control step of outputting said first AC voltage instruction signal based on a speed instruction signal given from the outside.

Further, a pulse width modulator of the present invention comprises a correction means for correcting so that the differences between two arbitrary instruction signals in three instruction signals may become more than the predetermined value, and a pulse width modulation means for modulating in pulse width the corrected output.

DETAILED DESCRIPTION OF THE PREFERRED EMBODIMENTS

Embodiment 1

Figure 1:
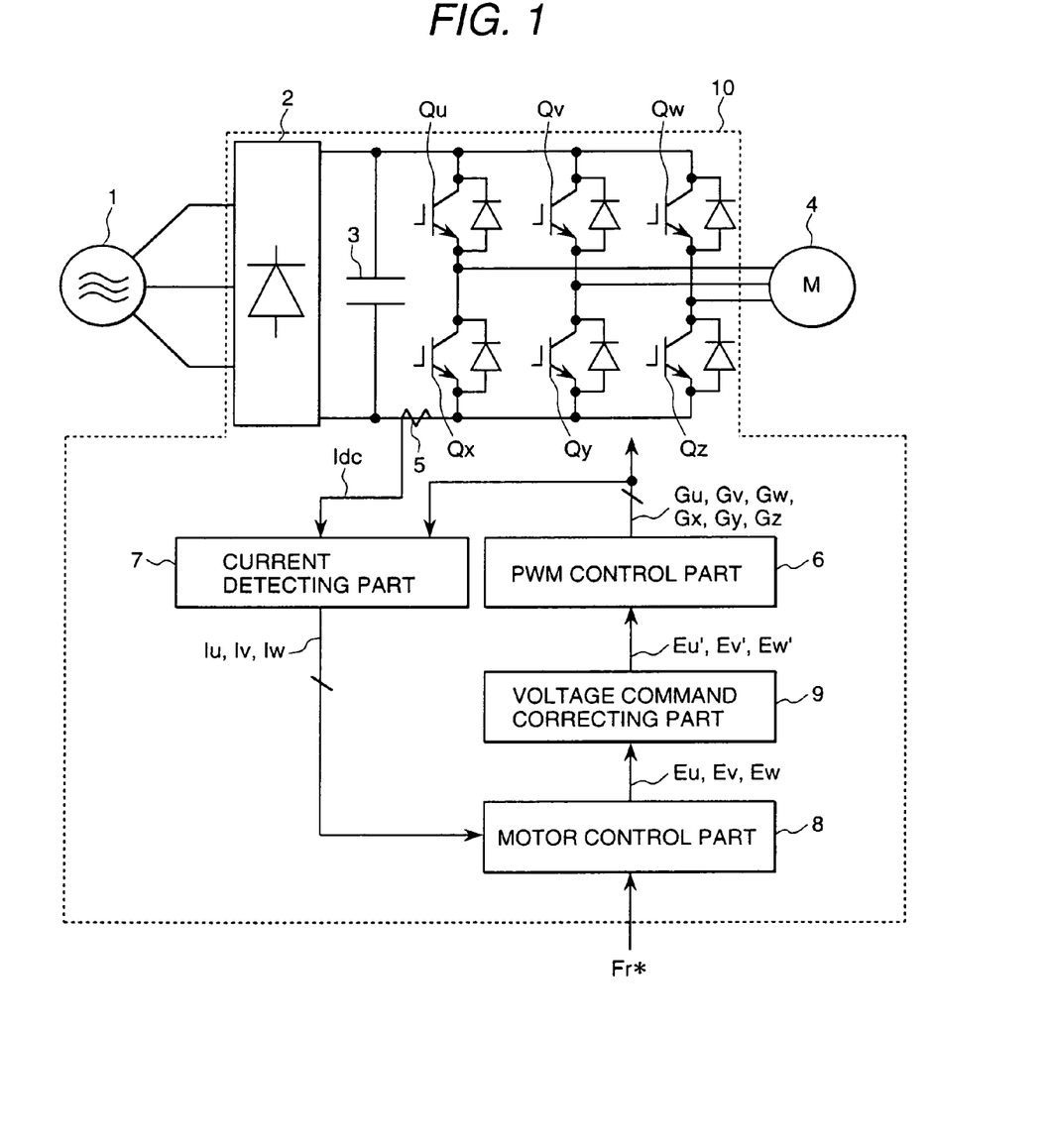
FIG. 1 is a block diagram of pulse width modulation device of the present invention.

FIG. 1 is a block diagram showing an example of the power converter which uses the pulse width modulation method according to the present invention.

The device shown in FIG. 1 includes rectification circuit 2, smoothing capacitor 3, current detector 5, electric current detecting element 7, motor control part 8 which outputs a first AC voltage instruction signal based on a speed instruction given from the outside, voltage instruction correction part 9 which generates a second AC voltage instruction signal by correcting the first AC voltage instruction signal, PWM control unit 6 which modulates in pulse width based on said second AC voltage instruction signal, and outputs a gate signal, and power converter 10 which has switching elements Qu, Qv, Qw, Qx, Qy, Qz for converting into an AC voltage by switching a DC voltage based on the gate signal, for converting the DC voltage into the AC voltage, AC power supply 1, and motor 4.

The voltage supplied from the AC power supply 1 is rectified by rectification circuit 2, and converted into the DC voltage by further smoothing by smoothing capacitor 3. The voltage of U-phase, V-phase and W-phase connected with motor 4 is controlled by switching the converted DC voltage by using switching elements Qu, Qv, Qw, Qx, Qy and Qz.

Current detector 5 detects DC current Idc which flows from switching elements Qx, Qy, and Qz to smoothing capacitor 3. Electric current detecting element 7 detects the detected DC current Idc and U-phase motor electric current Iu, V-phase motor electric current Iv, and W-phase motor electric current Iw which flows from gate signals Gu, Gv, Gw, Gx, Gy, and Gz which PWM control unit 6 outputs to motor 4. Motor control part 8 outputs a first U-phase AC voltage instruction signal Eu, a first V-phase AC voltage instruction signal Ev, and a first W-phase AC voltage instruction signal Ew based on speed instruction Fr* given from the outside and detected motor electric current Iu, Iv, Iw.

Voltage instruction correction part 9 outputs the second U-phase AC voltage instruction signal Eu', the second V-phase AC voltage instruction signal Ev', and the second W-phase AC voltage instruction signal Ew' by correcting the first AC voltage instruction signals Eu, Ev, and Ew. PWM control unit 6 modulates in pulse width based on the second AC voltage instruction signals Eu', Ev', and Ew', and outputs gate signals Gu, Gv, Gw, Gx, Gy, and Gz which instructs the switching of switching elements Qu, Qv, Qw, Qx, Qy, and Qz respectively.

In this embodiment, the DC voltage is generated from the AC power supply 1 by using rectification circuit 2 and smoothing capacitor 3. However, of course, rectification circuit 2 and smoothing capacitor 3 are unnecessary if the power supply is replaced to the DC power supply.

In voltage instruction correction part 9, the second AC voltage instruction signals Eu', Ev' and Ew' are operated so that the differences between two arbitrary AC voltage instruction signals of the second AC voltage instruction signals Eu', Ev' and Ew' may become more than the predetermined value, and the absolute values of the error integrated values dEu, dEv, and dEw obtained by multiplying each of the differences between the first AC voltage instruction signals Eu, Ev, and Ew and the second AC voltage instruction signals Eu', Ev', and Ew' may not become more than a certain value.

Concretely, each of the differences between the first AC voltage instruction signals Eu, Ev, and Ew and the second AC voltage instruction signals Eu', Ev', and Ew' is multiplied, and the error integrated values dEu, dEv, and dEw are obtained in voltage instruction correction part 9. The difference between two arbitrary AC voltages of the second AC voltage instruction signals Eu', Ev', and Ew' is processed to become more than the predetermined value based on the values obtained by multiplying the error integrated values dEu, dEv, and dEw by each of the first AC voltage instruction signal Eu, Ev, and Ew.

Voltage instruction correction part 9 will be explained in detail further by using FIG. 2 to FIG. 5.

Figure 2:
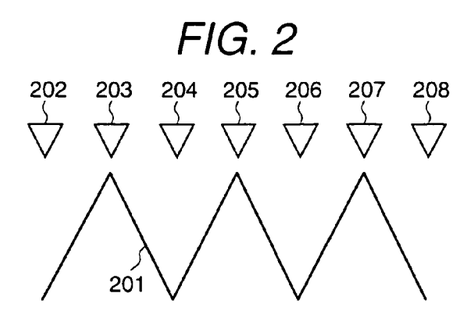
FIG. 2 is a view showing timing at which the second AC voltage instruction signal of voltage instruction correction part is updated.

FIG. 2 is a view showing the timing at which the second AC voltage instruction signals Eu', Ev', and Ew' are updated in voltage instruction correction part 9. In FIG. 2, reference numeral 201 designates the carrier wave used in the pulse width modulation of PWM control part 6, and 202-208 designates the timing at which voltage instruction correction part 9 updates the output. Voltage instruction correction part 9 executes the processing described later every half cycle of carrier wave 201, and outputs the second AC voltage instruction signals Eu', Ev', and Ew'.

Figure 3:
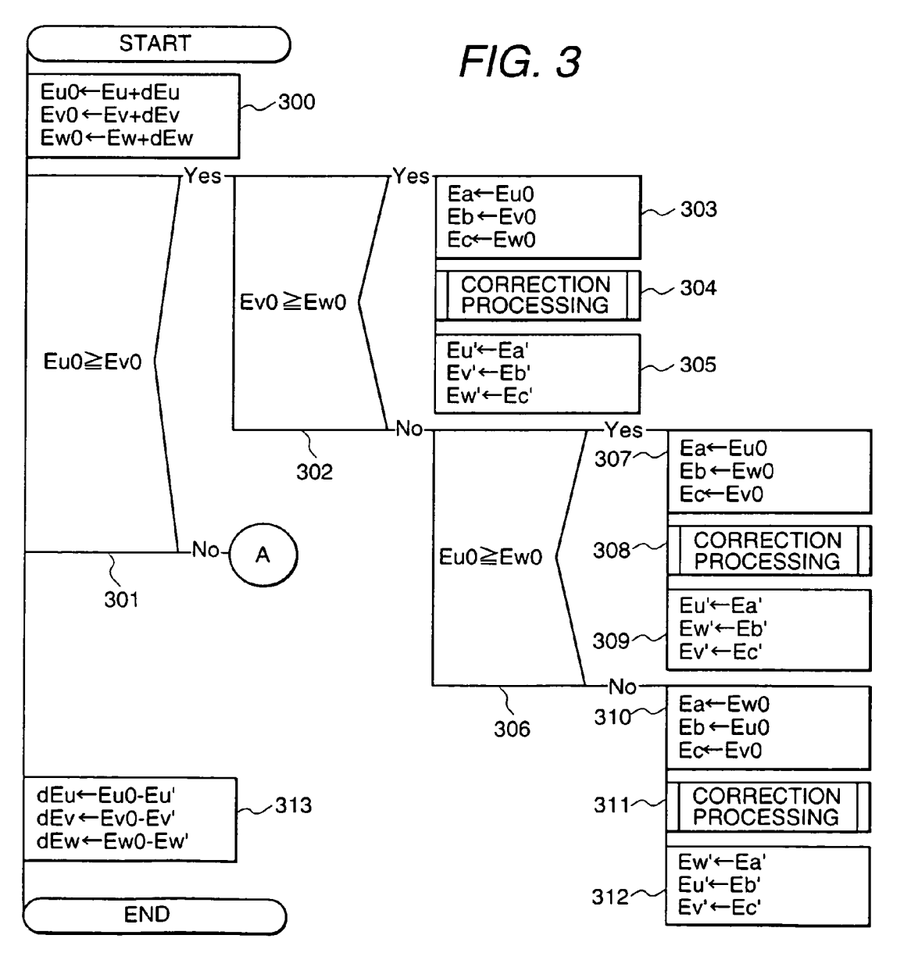
FIG. 3 is a flowchart showing the processing procedure in voltage instruction correction part.
Figure 4:
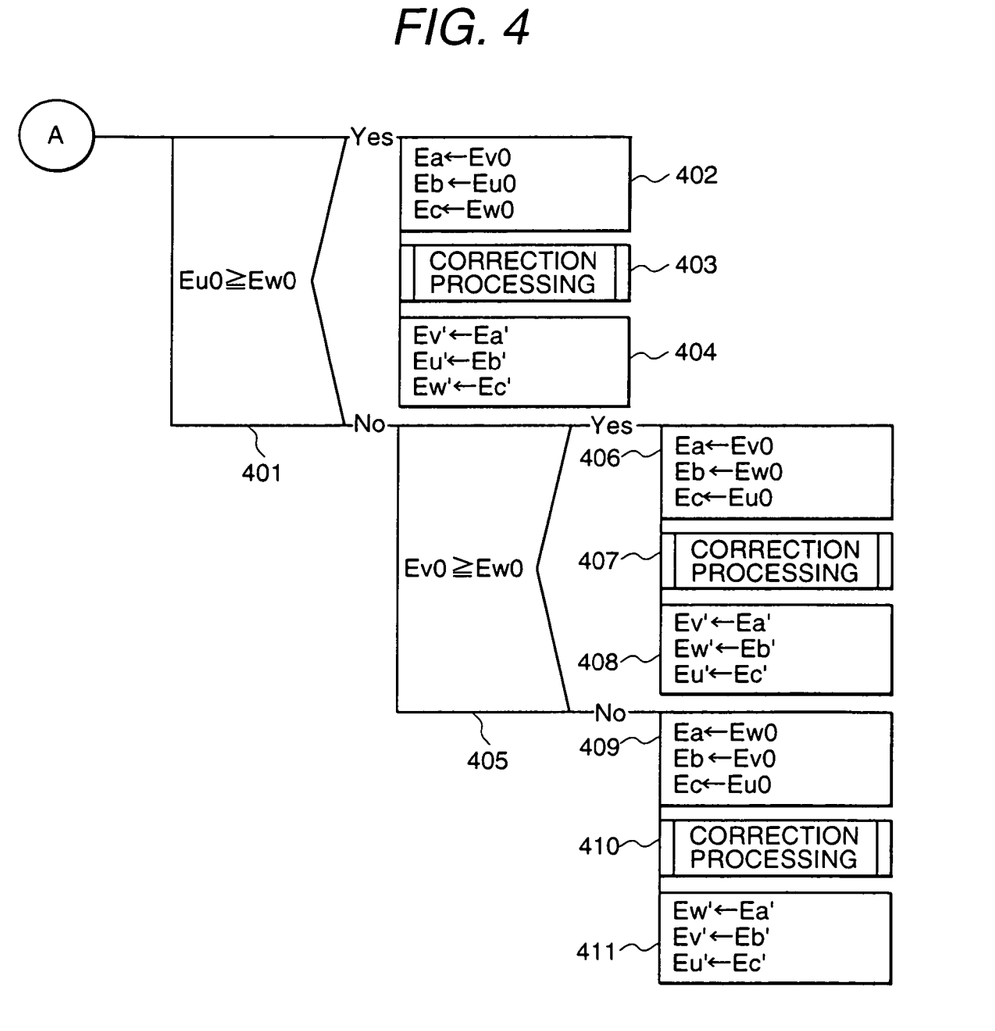
FIG. 4 is a flowchart showing the processing procedure in voltage instruction correction part.
Figure 5:
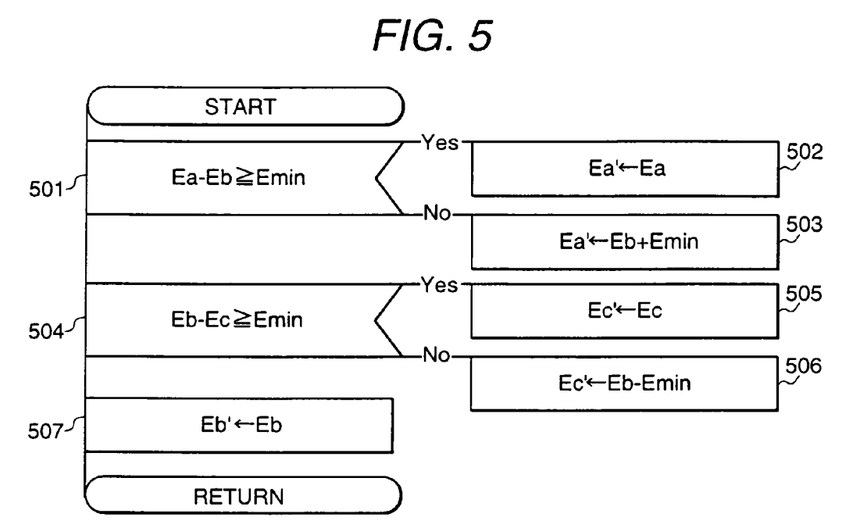
FIG. 5 is a flowchart showing the processing procedure in correction processing part shown in FIG. 3 and FIG. 4.

The processing shown in FIG. 3 and FIG. 4 are the main routines, and the processing shown in FIG. 5 is a sub routine.

FIG. 3 is a view showing the main flow of the processing in the voltage instruction correction part.

Processing 300 is executed first in voltage instruction correction part 9. In processing 300, the additive result of U-phase AC voltage instruction signal Eu and U-phase error integrated value dEu is substituted for the third U-phase AC voltage instruction signal Eu0. The additive result of V-phase AC voltage instruction signal Ev and V-phase error integrated value dEv is substituted for the third V-phase AC voltage instruction signal Ev0. The additive result of U-phase AC voltage instruction signal Eu and U-phase error integrated value dEu is substituted for the third W-phase AC voltage instruction signal Ev0. Next, processing 301 is executed.

In processing 301, the third U-phase AC voltage instruction signal Eu0 and the third V-phase AC voltage instruction signal Ev0 are compared. If Eu0 is Ev0 or more, then processing 302 is executed. Otherwise, processing 401 shown in FIG. 4 is executed.

In processing 302, the third V-phase AC voltage instruction signal Ev0 and the third W-phase AC voltage instruction signal Ew0 are compared. If Ev0 is Ew0 or more, processing 303 is executed. Otherwise, processing 306 is executed.

In processing 303, the third U-phase AC voltage instruction signal Eu0 is substituted for the first maximum voltage Ea. The third V-phase AC voltage instruction signal Ev0 is substituted for the first intermediate voltage Eb. The third W-phase AC voltage instruction signal Ew0 is substituted for the first minimum voltage Ec. Afterwards, processing 304 is executed. Details of the correction processing in processing 304 are described later.

Processing 305 is executed after processing 304. The second maximum voltage Ea' is substituted for the second U-phase AC voltage instruction signal Eu'. The second intermediate voltage Eb' is substituted for the second V-phase AC voltage instruction signal Ev'. The second minimum voltage Ec' is substituted for the second W-phase AC voltage instruction signal Ew'. Next, processing 313 is executed.

In processing 313, U-phase error integrated value dEu is updated by the value obtained by subtracting the second U-phase AC voltage instruction signal Eu' from the third U-phase AC voltage instruction signal Eu0. V-phase error integrated value dEv is updated by the value obtained by subtracting the second V-phase AC voltage instruction signal Ev' from the third V-phase AC voltage instruction signal Ev0. W-phase error integrated value dEw is updated by the value obtained by subtracting the second W-phase AC voltage instruction signal Ew' from the third W-phase AC voltage instruction signal Ew0. The processing of voltage instruction correction part 9 is ended.

Processing 306 is executed after processing 302. In processing 306, the third W-phase AC voltage instruction signals Ew0 and the third U-phase AC voltage instruction signal Eu0 are compared. If the third AC voltage instruction signal Eu0 is Ew0 or more, then processing 307 is executed. If Eu0 is less than Ew0, then processing 310 is executed.

Processing 307 is executed after processing 306. In processing 307, the third U-phase AC voltage instruction signal Eu0 is substituted for the first maximum voltage Ea. The third W-phase AC voltage instruction signal Ew0 is substituted for the first intermediate voltage Eb. The third V-phase AC voltage instruction signal Ev0 is substituted for the first minimum voltage Ec. Next, processing 308 is executed. Details of the correction processing in processing 308 are described later.

Processing 309 is executed after processing 308. The second maximum voltage Ea' is substituted for the second U-phase AC voltage instruction signal Eu'. The second intermediate voltage Eb' is substituted for the second W-phase AC voltage instruction signal Ew'. Further, the second minimum voltage Ec' is substituted for the second V-phase AC voltage instruction signal Ev'. Next, processing 313 is executed, and the processing in voltage instruction correction part 9 is ended.

Processing 310 is executed after processing 306. In processing 310, the third W-phase AC voltage instruction signal Ew0 is substituted for the first maximum voltage Ea. The third U-phase AC voltage instruction signal Eu0 is substituted for the first intermediate voltage Eb. Further, the third V-phase AC voltage instruction signal Ev0 substitutes for the first minimum voltage Ec. Then, processing 311 is executed. Details of the correction processing of processing 311 are described later.

Processing 312 is executed after processing 311. The second maximum voltage Ea' is substituted for the second W-phase AC voltage instruction signal Ew'. The second intermediate voltage Eb' is substituted for the second U-phase AC voltage instruction signal Eu'. Further, the second minimum voltage Ec' is substituted for the second V-phase AC voltage instruction signal Ev'. Next, processing 313 is executed, and the processing of voltage instruction correction part 9 is ended.

FIG. 4 is a view showing other parts of the main processing flow in voltage instruction correction part 9 shown in FIG. 3. In processing 301, if Eu0 is less than Ev0, processing 401 is executed. In processing 401, the third U-phase AC voltage instruction signal Ew0 and the third W-phase AC voltage instruction signal Ew0 are compared. If Eu0 is Ew0 or more, processing 402 is executed. Otherwise, processing 405 is executed.

In processing 402, the third V-phase AC voltage instruction signal Ev0 is substituted for the first maximum voltage Ea. The third U-phase AC voltage instruction signal Eu0 is substituted for the first intermediate voltage Eb. Further, the third W-phase AC voltage instruction signal Ew0 is substituted for the first minimum voltage Ec. Next, processing 403 is executed.

Processing 404 is executed on processing 403. The second maximum voltage Ea' is substituted for the second V-phase AC voltage instruction signal Ev'. The second intermediate voltage Eb' is substituted for the second U-phase AC voltage instruction signal Eu'. Further, the second minimum voltage Ec' is substituted for the second W-phase AC voltage instruction signal Ew'. Next, processing 313 is executed, and the processing of voltage instruction correction part 9 is ended.

In processing 405, the third U-phase AC voltage instruction signal Eu0 and the third W-phase AC voltage instruction signal Ew0 are compared. If Eu0 is Ew0 or more, then processing 406 is executed. Otherwise, processing 409 is executed.

In processing 406, the third V-phase AC voltage instruction signal Ev0 is substituted for the first maximum voltage Ea. The third W-phase AC voltage instruction signal Ew0 is substituted for the first intermediate voltage Eb. Further, the third U-phase AC voltage instruction signal Eu0 is substituted for the first minimum voltage Ec. Next, processing 407 is executed.

Processing 408 is executed after processing 407. The second maximum voltage Ea' is substituted for the second V-phase AC voltage instruction signal Ev'. The second intermediate voltage Eb' is substituted for the second W-phase AC voltage instruction signal Ew'. Further, the second minimum voltage Ec' is substituted for the second U-phase AC voltage instruction signal Eu'. Next, processing 313 is executed, and the processing of voltage instruction correction part 9 is ended.

In processing 409, the third W-phase AC voltage instruction signal Ew0 is substituted for the first maximum voltage Ea. The third V-phase AC voltage instruction signal Ev0 is substituted for the first intermediate voltage Eb. Further, the third U-phase AC voltage instruction signal Eu0 is substituted for the first minimum voltage Ec. Next, processing 410 is executed.

Processing 411 is executed after processing 410. The second maximum voltage Ea' is substituted for the second W-phase AC voltage instruction signal Ew'. The second intermediate voltage Eb' is substituted for the second V-phase AC voltage instruction signal Ev'. Further, the second minimum voltage Ec' is substituted for the second U-phase AC voltage instruction signal Eu'. Next, processing 313 is executed, and the processing of voltage instruction correction part 9 is ended.

By the above-mentioned processing, the largest value among the third AC voltage instruction signals Eu0, Ev0, and Ew0 is substituted for the first maximum voltage Ea. The intermediate value is substituted for the first intermediate voltage Eb. Further, the smallest value is substituted for the first minimum voltage Ec. Next, the correction processing is executed. The second maximum voltage Ea', the second intermediate voltage Eb' and the second minimum voltage Ec' obtained by the correction processing is substituted for the second AC voltage instructional signals Eu', Ev', and Ew' according to the magnitude of the third AC voltage instruction signals Eu0, Ev0, and Ew0. Moreover, the errors of the first AC voltage instruction signal Eu, Ev, Ew and the second AC voltage instruction signals Eu', Ev', Ew' by the correction are managed with error integrated values dEu, dEv, and dEw. The error integrated value does not keep increasing because the operation is executed including the error until last time by processing with the third AC voltage instruction signals Eu0, Ev0, and Ew0 in which error integrated values dEu, dEv, and dEw are added.

FIG. 5 shows a flowchart of the correction processing executed in processing 304, processing 308 and processing 311 in FIG. 3, and processing 403, processing 407 and processing 410 in FIG. 4. In the correction processing, the difference between the maximum voltage and the intermediate voltage, and the difference between the minimum voltage and the intermediate voltage by which the pulse width of DC current is decided is corrected to be the lowest voltage Emin or more which corresponds to the pulse width necessary to detect the DC current.

In the first processing 501, the difference between the 1st maximum voltage Ea and the 1st intermediate voltage Eb and the lowest voltage Emin are compared. If the difference between Ea and Eb is Emin or more, then, the processing 502 is executed. Otherwise, processing 503 is executed. In processing 502, the correction is not necessary. Therefore, the first maximum voltage Ea is substituted for the second maximum voltage Ea' as it is. Next, processing 504 is executed.

It is necessary to correct in processing 503. Therefore, the value in which the lowest voltage Emin is added to the first intermediate voltage Eb is substituted for the second maximum voltage Ea'. Next, processing 504 is executed. As a result, the difference between the second maximum voltage Ea and the first intermediate voltage Eb (the same as the second intermediate voltage Eb') becomes the lowest voltage Emin, and the relationship of the magnitude does not change either.

In processing 504, the difference between the first intermediate voltage Eb and the first minimum voltage Ec, and the lowest voltage Emin are compared. If the difference between Eb and Ec is Emin or more, then, processing 505 is executed. If the difference between Eb and Ec is less than Emin, then, processing 506 is executed.

In processing 505, the correction is not necessary. Therefore, the first minimum voltage Ec is substituted for the second minimum voltage Ec' as it is. Next, processing 507 is executed.

It is necessary to correct in processing 506. Therefore, the value obtained by subtracting the lowest voltage Emin from the first intermediate voltage Eb is substituted for the second minimum voltage Eb'. Processing 507 is executed. As a result, the difference between the second minimum voltage Ec and the first intermediate voltage Eb (the same as the second intermediate voltage Eb') becomes the lowest voltage Emin, and the relationship of the magnitude does not change either. In processing 507, the first intermediate voltage Eb is substituted into the second intermediate voltage Eb'.

The difference between the second maximum voltage Ea and the second intermediate voltage Eb' and the difference between the second intermediate voltage Eb' and the second minimum voltage Ec' becomes the lowest voltage Emin or more by the correction processing explained above. Moreover, because the magnitude does not change before and after the correction, the second maximum voltage Ea'≧ the second intermediate voltage Eb'≧ the second minimum voltage Ec' is satisfied. The lowest voltage Emin is used as a value added to the first intermediate voltage Eb in processing 503 and a value subtracted from Eb in processing 506. However, even if a value higher than the lowest voltage Emin is used instead of lowest voltage Emin, the object of the correction can be achieved. However, because the amount of the correction increases at this time, the error of the voltage before and after the correction increases.

The difference between the maximum value (Ea) and the intermediate value (Eb) is more than a certain value (Emin). Moreover, the difference between the intermediate value (Eb) and the minimum value (Ec) is more than a certain value (Emin). Therefore, the difference between maximum value (Ea) and minimum value (Ec) becomes more than a certain value (Emin). That is, each of three differences between instruction signals in the first AC voltage instruction signals is more than the predetermined value in this embodiment.

Figure 6:
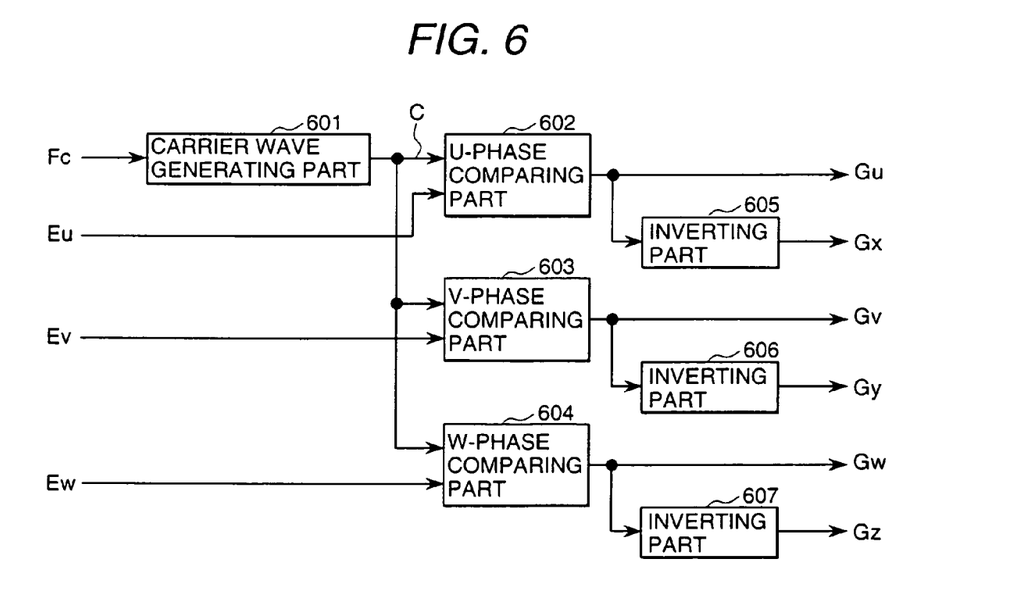
FIG. 6 is a circuit diagram showing the configuration of PWM control unit according to the present invention.

FIG. 6 is a circuit diagram showing the configuration of PWM control unit 6.

PWM control unit 6 has carrier wave generation part 601, U-phase comparison part 602, V-phase comparison part 603, W-phase comparison part 604, and reversing part 605, 606, 607.

Carrier wave generation part 601 outputs carrier wave C which is triangular wave of frequency Fc based on carrier wave frequency instruction Fc. U-phase comparison part 602 where gate signal Gu is output compares U-phase AC voltage instruction signal Eu and carrier wave C. H level is output when U-phase AC voltage instruction signal Eu is larger than carrier wave C. Otherwise, L level is output. Moreover, reversing part 605 where gate signal Gx is output outputs H level when gate signal Gu is in L level, and outputs L level when gate signal Gu is in H level.

As well as U-phase comparison part 602, V-phase comparison part 603 where gate signal Gv is output compares V-phase AC voltage instruction signal Ev and carrier wave C. W-phase comparison part 604 where gate signal Gw is output compares W-phase AC voltage instruction signal Ew and carrier wave C. Moreover, reversing part 606 where gate signal Gy is output and reversing part 607 where gate signal Gz is output supply the outputs as well as gate signal Gx.

Figure 7:
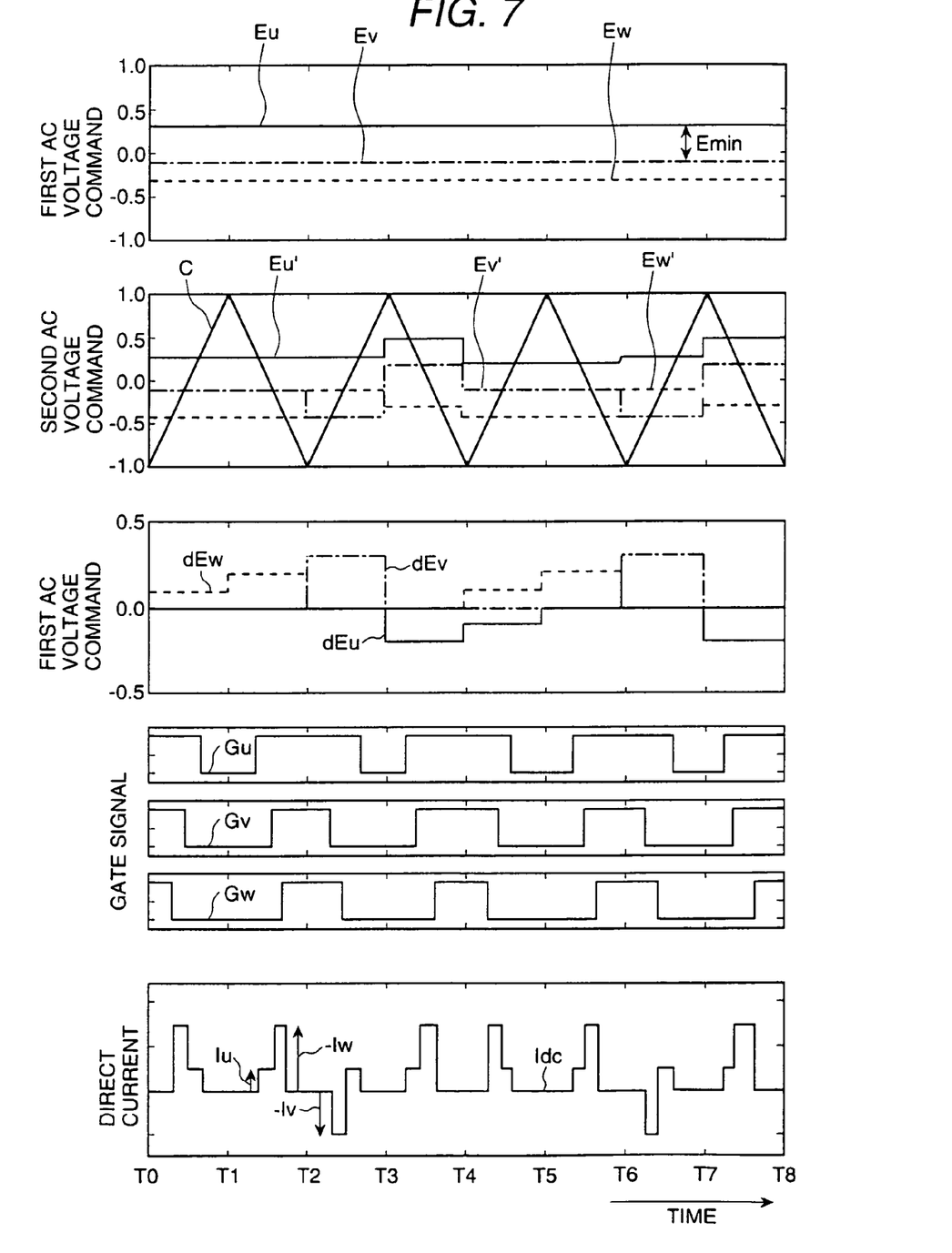
FIG. 7 is a view showing an operation example of the pulse width modulation method of the present invention.

FIG. 7 is an illustration to explain the concrete operation of this embodiment.

In the graph shown in FIG. 7, the abscissa axis designates time. The axis of ordinate designates the first AC voltage instruction signals Eu, Ev, and Ew, the second AC voltage instruction signals Eu', Ev' and Ew' and carrier wave C of the pulse width modulation, error integrated values dEu, dEv, and dEw, gate signals Gu, Gv, Gw, and DC current Idc.

The first AC voltage instruction signals Eu, Ev, and Ew are input signals of voltage instruction correction part 6 shown in FIG. 1. The values of those input signals are 0.3, −0.1, and −0.3, respectively. The second AC voltage instruction signals Eu', Ev', and Ew' are the signals corrected so that the differences are more than the predetermined value (0.3) based on the first AC voltage instruction signals Eu, Ev, and Ew. Each signal is changed sequentially as shown in FIG. 1.

Error integrated values dEu, dEv, and dEw are integrated values of the differences between the first AC voltage instruction signals Eu, Ev, and Ew, and the second AC voltage instruction signals Eu', Ev', and Ew'. The initial values are 0.0, 0.0, and 0.1, respectively. Moreover, the lowest voltage Emin is 0.3, and any of the absolute values of error integrated values dEu, dEv, and dEw are more than a fixed value.

The operation of voltage instruction correction part 9 at time T1 is as follows in an example. In processing 300 of FIG. 3, 0.3, −0.1, and −0.2 are substituted for the 3rd AC voltage instruction signals Eu0, Ev0, and Ew0 respectively.

At this time, because it is Eu0>Ev0>Ew0, processing 303 is executed via processing 301 and processing 302 of FIG. 3.

In processing 303, 0.3 is substituted for the first maximum voltage Ea. −0.1 is substituted for the first intermediate voltage Eb. −0.2 is substituted for the first minimum voltage Ec. Next, correction processing 304 of FIG. 3, that is, the correction processing shown in FIG. 5 is executed.

In processing 501 of FIG. 5 concerning correction processing 304, Ea−Eb=0.4 is compared with lowest voltage Emin=0.3. Because Ea−Eb is Emin or more, processing 502 is executed and 0.3 is substituted for the second maximum voltage Ea'. In the following processing 504, Eb−Ec=0.1 is compared with lowest voltage Emin=0.3. Because Eb−Ec is less than Emin, processing 506 is executed. In processing 506, −0.4 is substituted for the second minimum voltage Ec'. In processing 507, −0.1 is substituted for the second intermediate voltage Eb' and the correction processing is ended.

Next, processing 305 of FIG. 3 is executed. 0.3, −0.1, and −0.4 are substituted for the second AC voltage instruction signal Eu', Ev', and Ew' respectively. In the following processing 313, error integrated value dEu, dEv, and dEw a re renewed to 0.0, 0.0 and −0.2, respectively.

The pulse width modulation is performed in PWM control unit 6, based on carrier wave C, and second AC voltage instruction signals Eu', Ev', and Ew' output from voltage instruction correction 9 described above. In PWM control unit 6, the magnitudes of the carrier wave C and each of the second AC voltage instruction signals Eu', Ev', and Ew' which is the modulated wave are compared. If the modulated wave is larger, H level is output to the corresponding gate signal. Otherwise, L level is output.

Therefore, when gate signals Gu, Gv, and Gw are all at L level, U-phase gate signal Gu changes from the state of L level into H level in the beginning of the period of time T1-T2. Next, V-phase gate signal Gv changes into H level delaying only at the time which corresponds to the difference between the second U-phase AC voltage instruction signal Eu' and the second V-phase ac instruction Ev'. Afterwards, W-phase gate signal Gw changes into H level delaying only at the t time which corresponds to the difference between the second V-phase AC voltage instruction signal Ev' and the second W-phase AC instruction Ew'. Therefore, because the differences between the second AC voltage instruction signals Eu', Ev', and Ew' are lowest voltage Emin or more, the time which at least corresponds to lowest voltage Emin will be secured by the time another gate signals is changed after the arbitrary gate signal is changed.

Next, the relationship between the DC current Idc and gate signal for the period of time T1-T2 will be explained.

FIG. 7 shows the case where U-phase motor electric current Iu and V-phase motor electric current Iv are positive and W-phase motor electric current Iw is negative. When gate signals Gu, Gv, and Gw are all at L level, gate signals Gx, Gy, and Gz are at H level. At this time, switching elements Qu, Qv, and Qw are in an OFF state, and switching elements Qx, Qy, and Qz are in an ON state. Therefore, the electric current flows from switching elements Qx and Qy to motor 4, flows from motor 4 to switching element Qz, and returns to switching element Qu and Qy again. Therefore, the electric current does not flow to the DC current side, and DC current Idc is 0.

Next, X-phase gate signal Gx changes into L level when U-phase gate signal Gu changes into H level, and switching element Qu turns to an ON state and switching element Qx turns to an OFF state. At this time, the electric current flows from a positive pole of smoothing capacitor 3 to motor 4 through switching element Qu, and flows from motor 4 to a negative pole of smoothing capacitor 3 through switching element Qy and Qz. Therefore, the same electric current as U-phase motor electric current Iu flows to DC current Idc. Therefore, when the DC current is detected during this period, U-phase motor electric current Iu can be detected.

Next, Y-phase gate signal Gy changes into L level when V-phase gate signal Gv changes into H level, and switching element Qv turns to an ON state and switching element Qy turns to an OFF state. At this time, the electric current flows from a positive pole of smoothing capacitor 3 to motor 4 through switching element Qu and Qv, and flows from motor 4 to a negative pole of smoothing capacitor 3 through switching element Qz. Therefore, the same the electric current with reverse polarity as W-phase motor electric current Iw in the magnitude flows in DC current Idc. Therefore, when DC current is detected during this period, W-phase motor electric current Iw can be detected.

Next, Z-phase gate signal Gz changes into L level when W-phase gate signal Gw changes into H level, and switching element Qw turns to an ON state and switching element Qz turns to an OFF state. At this time, DC current Idc is 0 as well as the current when all of gate signals Gu, Gv, and Gw are at L level.

Therefore, the period from the change of gate signal Gu into H level from L level to the change of gate signal Gv into H level from L level, and the period from the change of gate signal Gv into H level from L level to the change of gate signal Gw into H level from L level are necessary to be secured enough to detect DC current Idc. This period is decided depending on the difference between the second V-phase AC voltage instruction signal Ev' and the second W-phase AC voltage instruction signal Ew', and the difference between the second U-phase AC voltage instruction signal Eu' and the second V-phase AC voltage instruction signal Ev'. The period when DC current Idc is detected can be secured by setting lowest voltage Emin to the value which corresponds to the time enough to detect DC current Idc when these differences are corrected to be at lowest voltage Emin or more.

Moreover, the average of the second AC voltage instruction signal Eu', Ev' and Ew' at the period of time from T1 to T8 is 0.33, −0.10, and −0.29, respectively, and almost becomes equal with the first AC voltage instruction signal Eu, Ev, and Ew. Moreover, the error between the first AC voltage instruction signals Eu, Ev, and Ew and the average of the second AC voltage instruction signals Eu', Ev', and Ew' is managed by that W-phase error integrated value dEu is 0.1, and U-phase error integrated value dEu is 0.2 at time T7 to T8.

In addition, the absolute value of error integrated value dEu, dEv, and dEw becomes below a certain value as clearly seen from FIG. 7.

Although the error integrated value is used to control the voltage error due to the correction in this embodiment, the processing concerning the error integrated value can be omitted in the case that the demand for the voltage error is not severe. Concretely, processing 313 is omitted by assuming error integrated value dEu, dEv, and dEw to be 0 in processing 300 of FIG. 3 and using the first AC voltage instruction signal Eu, Ev, and Ew as the third AC voltage instruction signal Eu0, Ev0, and Ew0. As a result, the processing can be reduced. In this case, the difference of two arbitrary AC voltage instruction signal of the second AC voltage instruction signal Eu', Ev', and Ew' is set to become more than the predetermined value based on the first AC voltage instruction signal Eu, Ev, and Ew in voltage instruction correction part 9.

As for the pulse width of DC current Idc, the width which can detect the electric current is secured without fail according to this embodiment. The necessary period between arbitrary switching and arbitrary switching is also secured. Therefore, mutual interference of the switching is not generated. Moreover, it is possible to make the motor electric current of the small capacity inverter CT-less, and make the electric current detection efficient in this embodiment. As a result, it becomes possible to protect the switching element in a large capacity, and detect stably the electric current at low speed.

In addition, the DC current can be held in the sample even at a low voltage and in a high carrier, and the narrowness width recovery according to another phase switching can be prevented in this embodiment.

Moreover, because the difference of the modulated waves between two arbitrary phases can be made more than the lowest value, the interval when two arbitrary pulses change can be made more than the time which corresponds to the lowest value in the pulse output modulated in pulse width according to this embodiment. Moreover, the detection of DC current becomes possible because the pulse width of the DC current also becomes more than time that corresponds to the lowest value by applying this pulse width modulation to the power converter.

There is no problem in the electric current detection even when the update of the correction result is performed at the integral multiply of the half cycle of the carrier wave, because the electric current pulse width of the DC current can be secured more than the width which can detect the electric current without fail. Therefore, because the operation cycle can be enlarged, the amount of the operation each unit time in the pulse width modulation method can be decreased, and the interval when the pulse changes is secured, the pulse width modulation where mutual interference of the switching is not generated can be obtained.

Embodiment 2

Figure 8:
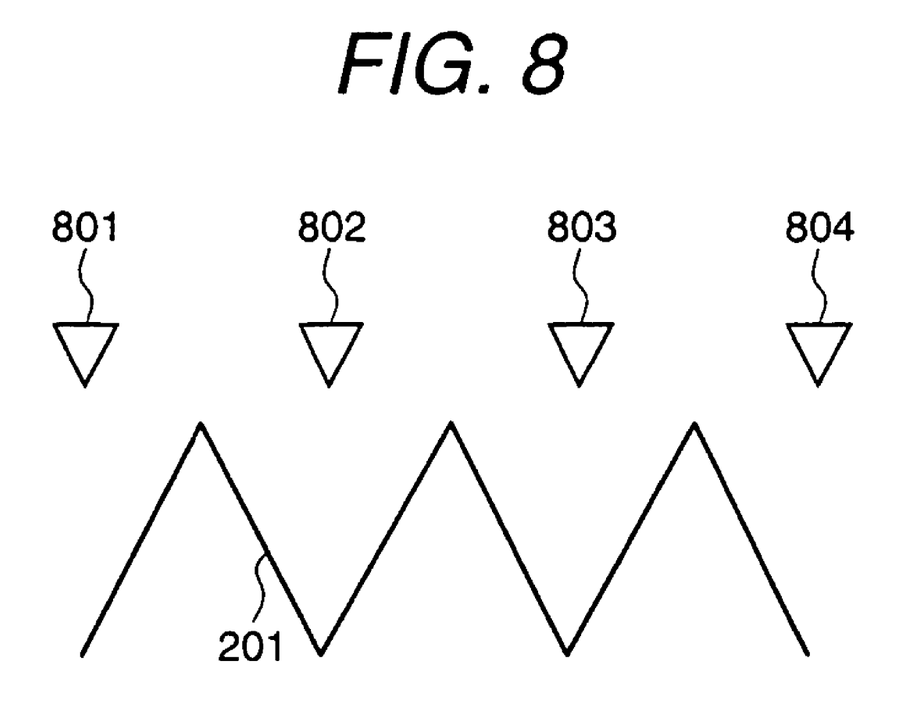
FIG. 8 is a view showing timing at which the second AC voltage instruction signal of voltage instruction correction part is updated.

FIG. 8 shows the example of changing timing at which the output or the second AC voltage instruction signals Eu', Ev' and Ew' are updated in the voltage instruction correction part.

In FIG. 8, reference numeral 201 designates a carrier wave used by the pulse width modulation in PWM control unit 6, and 801 to 804 designate timing at which voltage instruction correction part 9 updates the output. Voltage instruction correction part 9 outputs the second AC voltage instruction signals Eu', Ev', and Ew' every one cycle of carrier wave 201. Because the pulse width of DC current Idc is secured without fail, the electric current can be detected at a half cycle of the carrier wave in this embodiment. Therefore, there are not any problems in the electric current detection even if the output timing is done at a time every one cycle as shown in FIG. 8. Further, there is no problem even when the cycle of the output timing can be made to an integral multiple of half cycle of the carrier wave at within the range where the update cycle of the voltage instruction signal becomes long. As a result, lengthening the operation cycle in voltage instruction correction part 9 becomes possible, and the amount of the operation each unit time can be decreased, that is, the effect same as embodiment 1 is achieved.

What is claimed is:

1. A pulse width modulation method for operating a power converter to generate an output current, said method comprising:

a pulse width modulating three first instruction signals that are modulated waves, based on a comparison of the first instruction signals and a carrier wave;

switching the power converter, based on a gate signal obtained from said instruction signals, to convert a DC voltage into an AC voltage; and detecting a DC current of the power converter; wherein the method further comprises, generating three third voltage instruction signals by adding error integrated values to each of the three first instruction signals;

for each of said third voltage instruction signals, obtaining an alternative maximum voltage instruction signal by adding a predetermined minimum voltage value to an intermediate value of said third voltage instruction signal whenever a difference between a maximum value of the third voltage instruction signal and the intermediate value of the third voltage instruction signal is less than the predetermined minimum voltage value;

setting the maximum value of the third voltage instruction signal as the alternative maximum voltage instruction signal when the difference between the maximum value of the third voltage instruction signal and the intermediate value equals or exceeds the predetermined minimum voltage value;

for each of said third voltage instruction signals, obtaining an alternative minimum voltage instruction signal by subtracting the predetermined minimum voltage value from the intermediate value of the third voltage instruction signal whenever a difference between the intermediate value of the third voltage instruction signal and the minimum value of the third voltage instruction signal is less than the predetermined minimum voltage value, and setting the minimum value of the third voltage instruction signal as the alternative minimum voltage instruction signal when the difference between the intermediate value and the minimum value equals or exceeds the predetermined minimum voltage value; wherein, said error integrated values are obtained by subtracting the intermediate value of the third voltage instruction signals, the alternative maximum voltage instruction signal, and the alternative minimum voltage instruction signal from the three third voltage instruction signals, respectively; and said pulse width modulation is performed by comparing the alternative maximum voltage instruction signal, the alternative minimum voltage instruction signal, and the intermediate value of the third voltage instruction signal with the carrier wave.

2. The pulse width modulation method according to claim 1, wherein said alternative maximum voltage instruction signal is updated every half cycle of the carrier wave.

3. The pulse width modulation method according to claim 1, wherein said alternative maximum value instruction signal is updated at integral multiple intervals of a half cycle of the carrier wave.

* * * * *